(12) United States Patent
Huang et al.

(10) Patent No.: US 8,374,001 B2
(45) Date of Patent: Feb. 12, 2013

(54) POWER SUPPLY CONTROL CIRCUIT AND METHOD FOR SENSING VOLTAGE IN THE POWER SUPPLY CONTROL CIRCUIT

(75) Inventors: Chun-Yen Huang, Zhubei (TW); Chia-Chuan Liu, Taipei (TW)

(73) Assignee: Richtek Technology Corporation, Hsin-Chu (TW)

( * ) Notice: Subject to any disclaimer, the term of this patent is extended or adjusted under 35 U.S.C. 154(b) by 136 days.

(21) Appl. No.: 12/589,693

(22) Filed: Oct. 27, 2009

(65) Prior Publication Data

US 2010/0165665 A1    Jul. 1, 2010

(30) Foreign Application Priority Data

Dec. 29, 2008  (TW) .............................. 97151179 A (51) Int. Cl.
*H02M 3/335*    (2006.01)
(52) U.S. Cl. .................................... 363/21.01
(58) Field of Classification Search ................... 363/20, 363/21.01, 21.04, 21.09, 21.12, 21.17
See application file for complete search history.

(56) References Cited

U.S. PATENT DOCUMENTS

| | | | | |
|---|---|---|---|---|
| 5,138,543 A | * | 8/1992 | Harm et al. | 363/21.08 |
| 5,757,625 A | * | 5/1998 | Schoofs | 363/21.13 |
| 5,901,052 A | * | 5/1999 | Strijker | 363/21.16 |
| 6,518,733 B1 | | 2/2003 | Schenkel et al. | |
| 6,636,021 B2 | | 10/2003 | Schenkel et al. | |
| 6,856,522 B1 | * | 2/2005 | Wittenbreder, Jr. | 363/21.01 |
| 7,292,005 B2 | | 11/2007 | Pietkiewicz | |
| 2006/0250824 A1 | * | 11/2006 | Wekhande et al. | 363/20 |
| 2006/0285365 A1 | * | 12/2006 | Huynh et al. | 363/16 |
| 2007/0252567 A1 | * | 11/2007 | Dearn et al. | 323/282 |
| 2008/0144343 A1 | * | 6/2008 | Yang | 363/78 |
| 2008/0273354 A1 | * | 11/2008 | Ryu et al. | 363/21.06 |
| 2009/0027035 A1 | * | 1/2009 | Hsu | 323/352 |
| 2009/0206814 A1 | * | 8/2009 | Zhang et al. | 323/284 |
| 2009/0256543 A1 | * | 10/2009 | Yang | 323/284 |

FOREIGN PATENT DOCUMENTS

| | | |
|---|---|---|
| JP | 2005-192382 A | 7/2005 |
| JP | 2007-244076 A | 9/2007 |

* cited by examiner

*Primary Examiner* — Adolf Berhane
*Assistant Examiner* — Gustavo Rosario Benitez
(74) *Attorney, Agent, or Firm* — Tung & Associates (57) ABSTRACT

The present invention discloses a power supply control circuit, the power supply providing an output voltage to an output terminal from an input terminal through a transformer having a primary winding and a secondary winding, the power supply control circuit comprising: a power switch electrically connected with the primary winding; a switch control circuit controlling the power switch; and a sensing circuit supplying an output signal to the switch control circuit according to voltage signals obtained from two sides of the primary winding, wherein the sensing circuit includes a setting circuit for deciding the output voltage according to a reference signal. The present invention also relates to a voltage sensing method in the power supply control circuit.

13 Claims, 11 Drawing Sheets

Vsw

Vsw

Masking Signal

Noise Masked Signal

Fig. 13

POWER SUPPLY CONTROL CIRCUIT AND METHOD FOR SENSING VOLTAGE IN THE POWER SUPPLY CONTROL CIRCUIT

BACKGROUND OF THE INVENTION

1. Field of Invention

The present invention relates to a voltage sensing method, which can be applied to a control circuit of a power supply which converts a voltage by a transformer, such as a photoflash charger control circuit.

2. Description of Related Art

Figure 1:
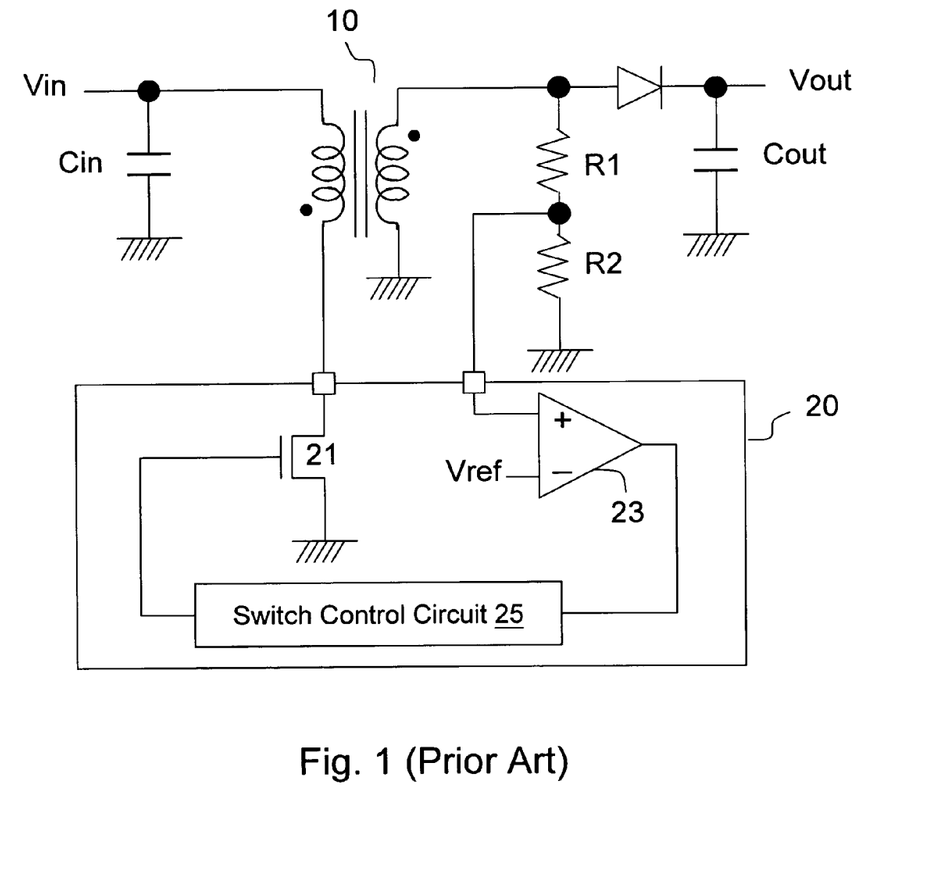
FIG. 1 is a schematic circuit diagram of a prior art power supply circuit.

Power supplies which convert a voltage by a transformer are applied in many applications. One of the applications is chargers such as a photoflash charger. The basic structure of such charger is shown in the upper part of FIG. 1. A capacitor Cout at the output terminal Vout is charged from an input terminal Vin via a transformer. The charging time is controlled by a power switch 21 in a charger control circuit 20. The charger control circuit 20 is typically integrated as an integrated circuit (IC). In the prior art shown in FIG. 1, the power switch 21 is controlled by a switch control circuit 25, and the switch control circuit 25 determines whether to enable the power switch 21 according to a voltage detection at the secondary side of a transformer 10. More specifically, a feedback voltage is obtained through resistors R1 and R2 by voltage division. A comparator 23 compares the feedback voltage with a reference voltage Vref; then the switch control circuit 25 determines whether to enable the power switch 21 according to the result of the comparison.

The drawback of the prior art mentioned above is that resistors R1 and R2 (particularly, R1) need to sustain high voltage, because the dividend voltage is obtained from the secondary side which is the high voltage side. Some prior art proposes to divide the resistor R1 to two resistors, but the fact that they need to sustain high voltage remains the same.

Figure 2:
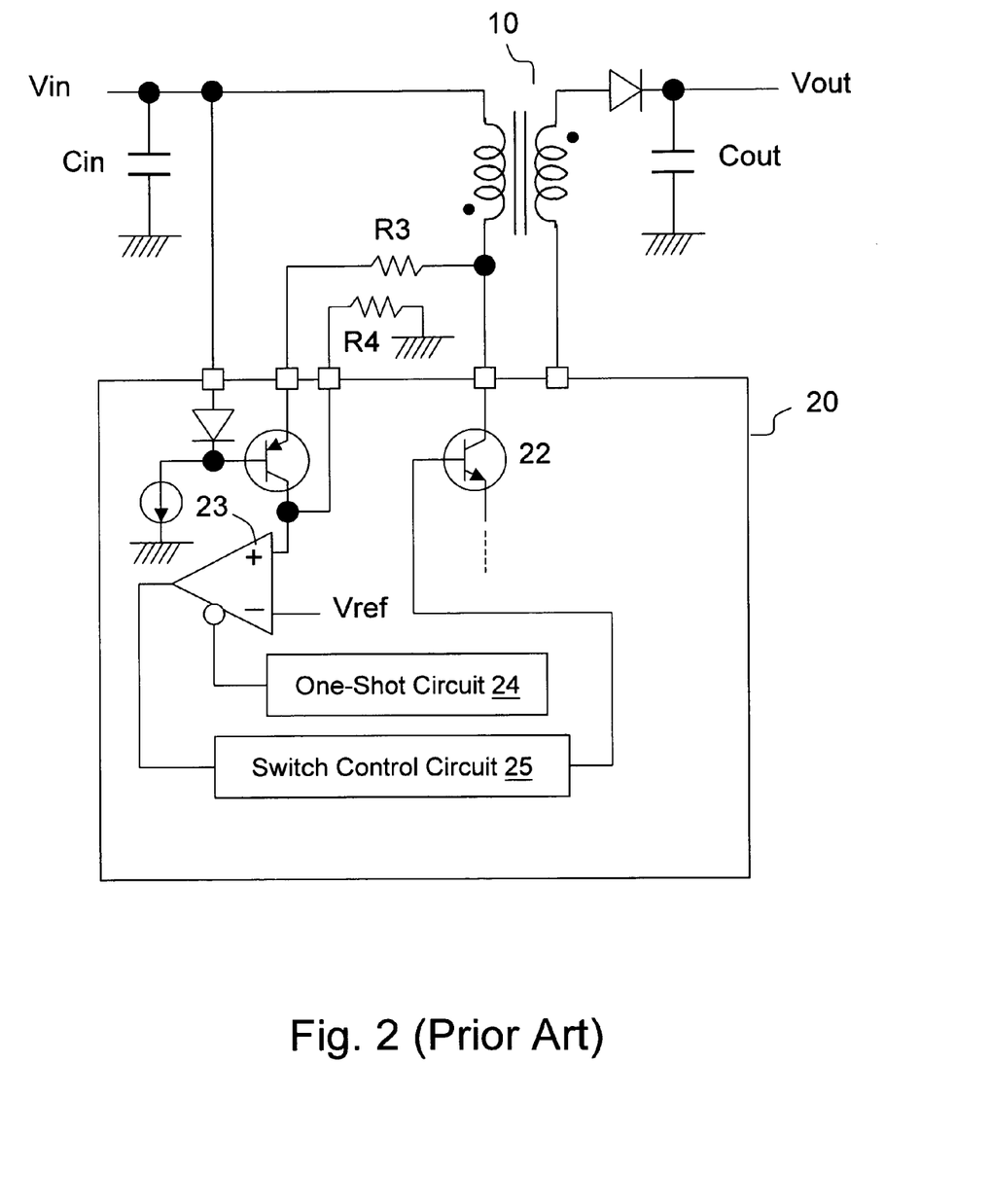
FIG. 2 is a schematic circuit diagram of another prior art power supply circuit.

U.S. Pat. Nos. 7,292,005; 6,636,021; and 6,518,733 disclose another type of approach as shown in FIG. 2. This approach obtains a signal from the primary side, and compares the signal with a reference signal Vref in the comparator 23. The result of the comparison is transmitted to the switch control circuit 25, which determines whether to enable a power switch 22 based on the comparison. In this prior art, the power switch is implemented by a bipolar junction transistor 22, but the basic principle remains the same. This prior art also discloses a one-shot circuit 24 for masking a switching ringing.

One drawback of the second prior art is that, even though the feedback voltage is not obtained from the secondary side, and the resistor specification for sustaining high voltage can be relatively lower, but it requires two external resistors R3 and R4.

With respect to switching ringing, U.S. Patent Publication No. 2006/0250824 discloses a method to filter such noise by a low-pass filter circuit.

Even though the second and third prior art avoid the problem in the first approach which obtains the feedback signal from the secondary side, i.e., the requirement of devices capable of sustaining high voltage, they still have one common drawback as described below. The transformer employed in the charger may have different turn ratios in different applications. The prior art power supply control circuit can not adjust its output voltage detection and setting in correspondence with different turn ratios (the detection determines where the output voltage is balanced at, and therefore the adjustment of the detection can be regarded as the adjustment on the output voltage setting). If the transformer turn ratio is different, it is necessary to modify the internal circuitry of the charger control circuit, and re-produce a different integrated circuit to cope with it. In other words, the same integrated circuit can only be applied to one single application.

In view of the above drawbacks, it is desired to provide a power supply control circuit and a method for sensing voltage in a power supply control circuit, which do not require a device sustaining high voltage, and furthermore the output voltage detection and setting can be flexibly adjusted in correspondence to the transformer turn ratio.

SUMMARY OF THE INVENTION

A first objective of the present invention is to provide a power supply control circuit with flexibility on output voltage setting to overcome the drawbacks of the aforementioned prior art circuits.

A second objective of the present invention is to provide a method for sensing voltage in a power supply control circuit.

To achieve the above and other objectives, from one perspective, the present invention provides a power supply control circuit, the power supply providing an output voltage to an output terminal from an input terminal through a transformer having a primary winding and a secondary winding. The power supply control circuit comprises: a power switch electrically connected to the primary winding; a switch control circuit controlling the power switch; and a sensing circuit supplying an output signal to the switch control circuit according to voltage signals obtained from two sides of the primary winding, wherein the sensing circuit includes a setting circuit for deciding the output voltage according to a reference signal.

In a preferred embodiment of the power supply control circuit, the setting circuit provides a setting current signal, and the sensing circuit converts the voltage signals obtained from the two sides of the primary winding to a first and a second current signals, and supplies the output signal to the switch control circuit according to the first, the second, and the setting current signals.

From another perspective, the present invention provides a method for sensing voltage in the power supply control circuit, comprising the steps of: providing a power supply, the power supply providing an output voltage to an output terminal from an input terminal through a transformer having a primary winding and a secondary winding; providing a power switch electrically connecting to the primary winding; generating a first and a second signals according to voltage signals obtained from two sides of the primary winding; generating a setting signal; controlling the power switch according to the first, the second, and the setting signals; and deciding the output voltage according to the setting signal.

The power supply control circuit and the voltage sensing method may further comprise a circuit or a step for masking a switching ringing noise generated when the power switch is switching.

The objectives, technical details, features, and effects of the present invention will be better understood with regard to the detailed description of the embodiments below.

DESCRIPTION OF THE PREFERRED EMBODIMENTS

Figure 3:
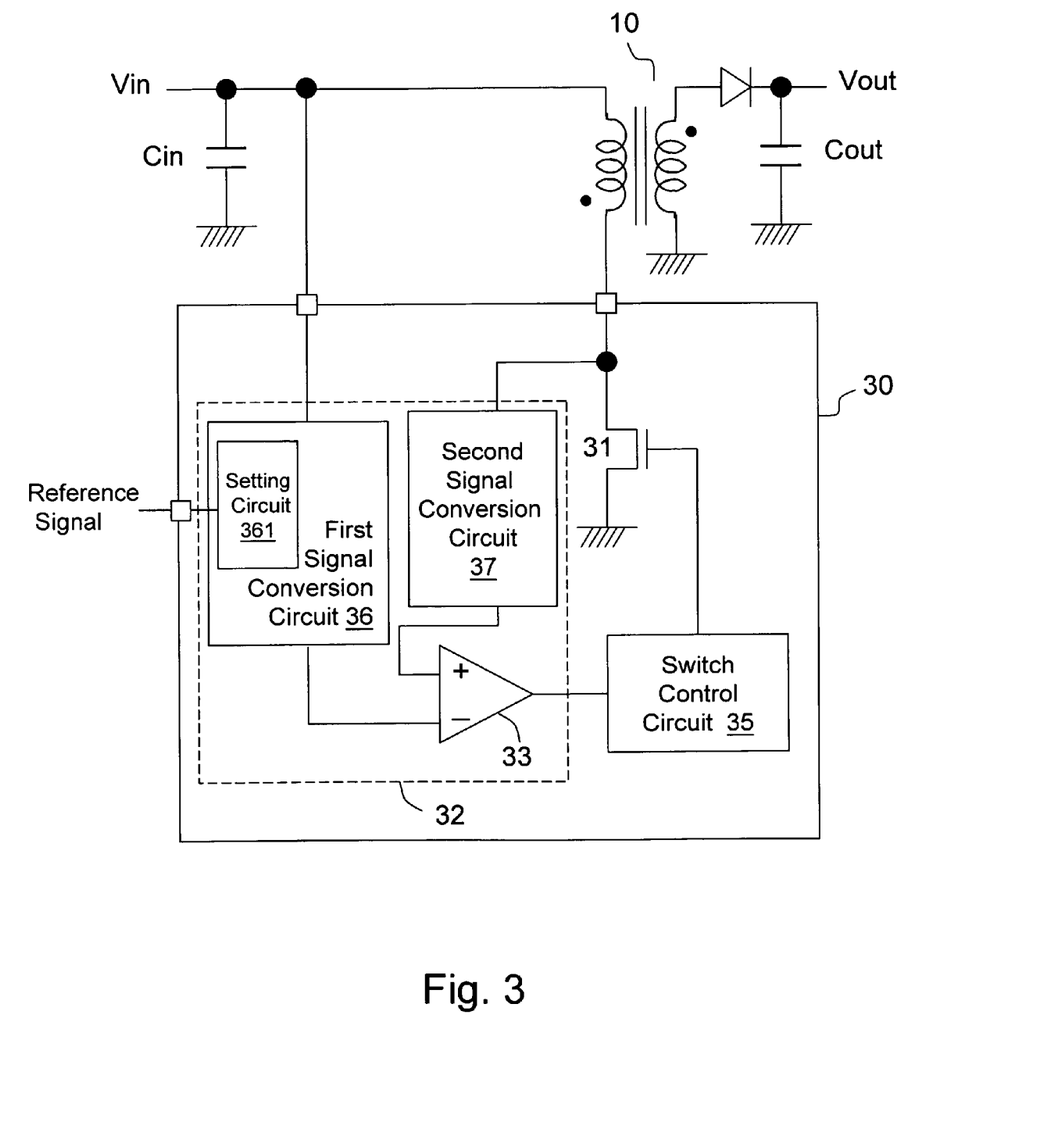
FIG. 3 and FIG. 4 are schematic circuit diagrams which show two embodiments of the present invention, respectively.

FIG. 3 shows the first embodiment of the present invention. A power supply control circuit 30 according to the present invention comprises a power switch 31, a switch control circuit 35, and a sensing circuit 32. The sensing circuit 32 obtains a signal from the primary side of a transformer and generates an output signal which is supplied to the switch control circuit 35 for controlling the power switch 31. More specifically, a signal obtained from an input voltage Vin is processed by a first signal conversion circuit 36, and thereafter input to an input terminal of a comparator 33. Another signal obtained from the other side of the transformer primary winding is processed by a second signal conversion circuit 37 and thereafter input to the other input terminal of the comparator 33. The comparator 33 compares the two signals, and the comparison result is transmitted to the switch control circuit 35 so that it can determine whether to enable the power switch 31 accordingly. Note that it is not necessary for the two signal conversion circuits 36 and 37 to provide sophisticated signal processing functions. It suffices to make the input voltage signal Vin and the signal obtained from the other side of the transformer primary winding matching to each other for the comparison purpose. In one embodiment, the two signal conversion circuits 36 and 37 are voltage to current conversion circuits with appropriate conversion ratios, respectively. More details will be depicted later with reference to FIG. 5.

One feature of the present invention is that the sensing circuit 32 includes a setting circuit 361. The setting circuit 361 can decide the output voltage sensing result in the control circuit 30 according to a reference signal. By adjusting the reference signal, the detection and setting with respect to the output voltage can be adjusted flexibly in correspondence to the turn ratio of the transformer.

Figure 4:
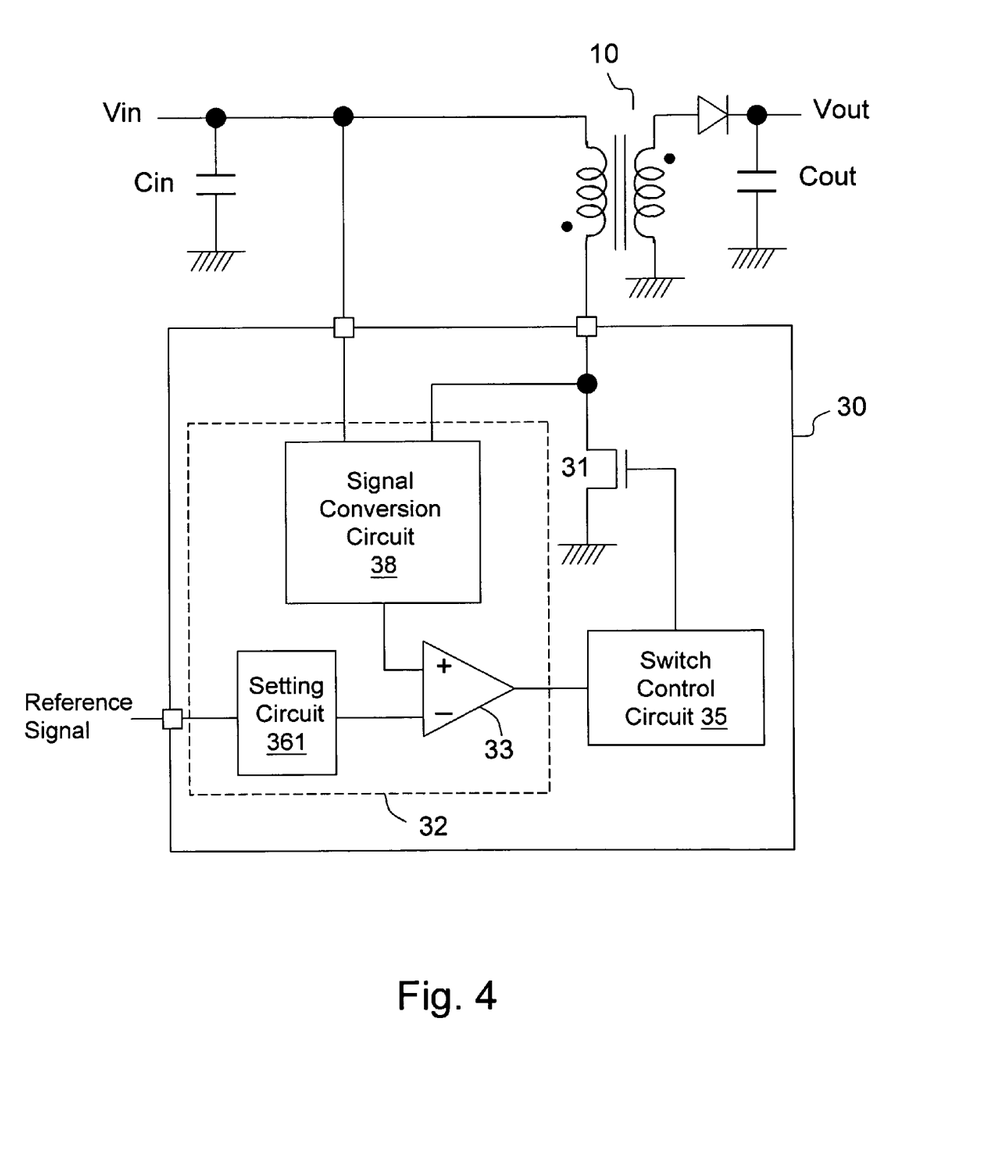

FIG. 4 shows another embodiment of the present invention. In this embodiment, a signal obtained from the input voltage Vin and a signal obtained from the other side of the transformer primary winding are converted by one single conversion circuit 38. The conversion performed by this circuit includes, for example, converting both signals to current signals with an appropriate ratio and then obtaining a difference between them by subtracting one from the other. The converted signal is input to one input terminal of the comparator 33. A setting signal generated by the setting circuit 361 is input to another input terminal of the comparator 33. Similarly, after the comparator 33 compares the two input signals, the result is output to the switch control circuit 35. The switch control circuit 35 determines whether to enable the power switch 31 according to the result.

Figure 5:
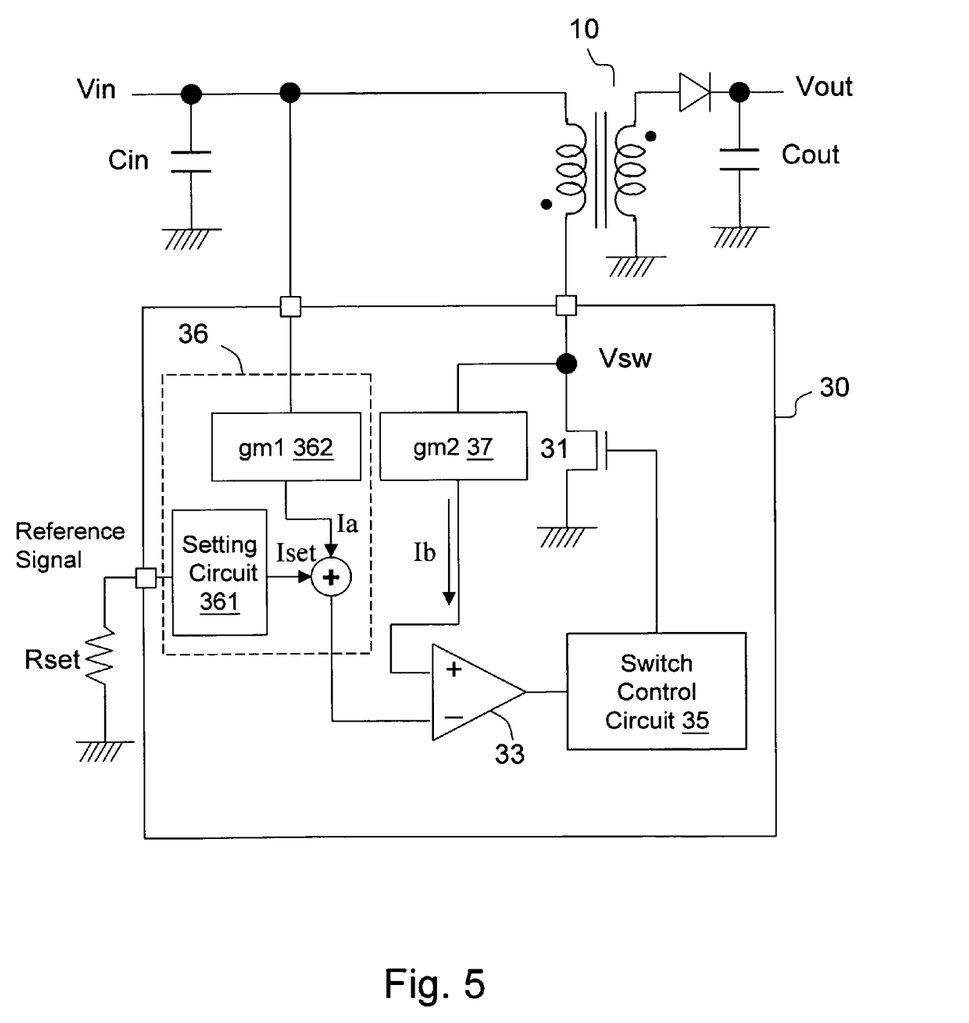
FIG. 5 shows a more specific embodiment of the circuit in FIG. 3.

FIG. 5 shows a more specific embodiment of the circuit in FIG. 3. Referring to FIG. 5, we will explain how a setting signal generated by the setting circuit 361 sets an output voltage. In this embodiment, the comparator 33 is a current comparator, and the first and second signal conversion circuits 36 and 37 respectively include a first and a second voltage to current conversion circuits (gm1 362 and gm2 37), each with an appropriate conversion ratio. The first voltage to current conversion circuit 362 converts the input voltage Vin to the current Ia, and the second voltage to current conversion circuit 37 converts the voltage Vsw at the other side of the primary winding to the current Ib. The setting signal generated by the setting circuit 361 is the current signal Iset, which for example is determined by a resistor Rset. Suppose the ratios by which the first and second conversion circuits 362 and 37 convert the voltage signals to the current signals are both gm:

$Ia=gm*Vin$ $Ib=gm*Vsw$

Then when the circuit is stable, Ib =Ia +Iset, and therefore:

$gm*Vsw=gm*Vin+Iset$ $gm*(Vsw-Vin)=Iset$ $Vsw-Vin=(1/gm)*Iset$

And, let the turn ratio of the transformer secondary winding to the primary winding be N, then $Vout=(Vsw-Vin)*N$ $Vsw-Vin=(1/N)*Vout=(1/gm)*Iset$ $\therefore Vout=(1/gm)*N*Iset$ That is, regardless what the turn ratio N is, the setting signal Iset can be determined according to any given N and the desired output voltage Vout. In other words, the output voltage Vout can be flexibly adjusted according to the setting signal Iset in the present invention.

Those skilled in this art can readily understand that the concept of FIG. 5 can be applied to the embodiment of FIG. 4. The only difference is that, in FIG. 4, the difference between Ia and Ib is input to one input terminal of the comparator 33, and the signal Iset is input to the other input terminal of the comparator 33; when the circuit reaches a stable and balanced state, the same relationship Ib=Ia+Iset is reached, which leads to the same equation Vout=(1/gm)*N*Iset.

Figure 6:
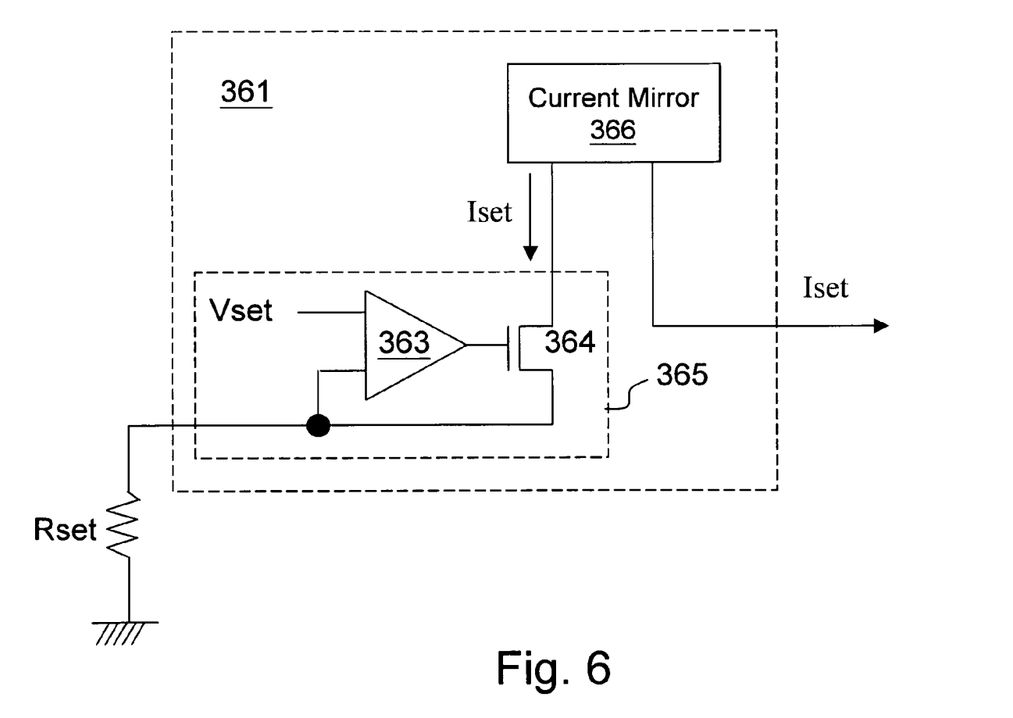
FIG. 6 shows an example of the setting circuit 361.
Figure 7:
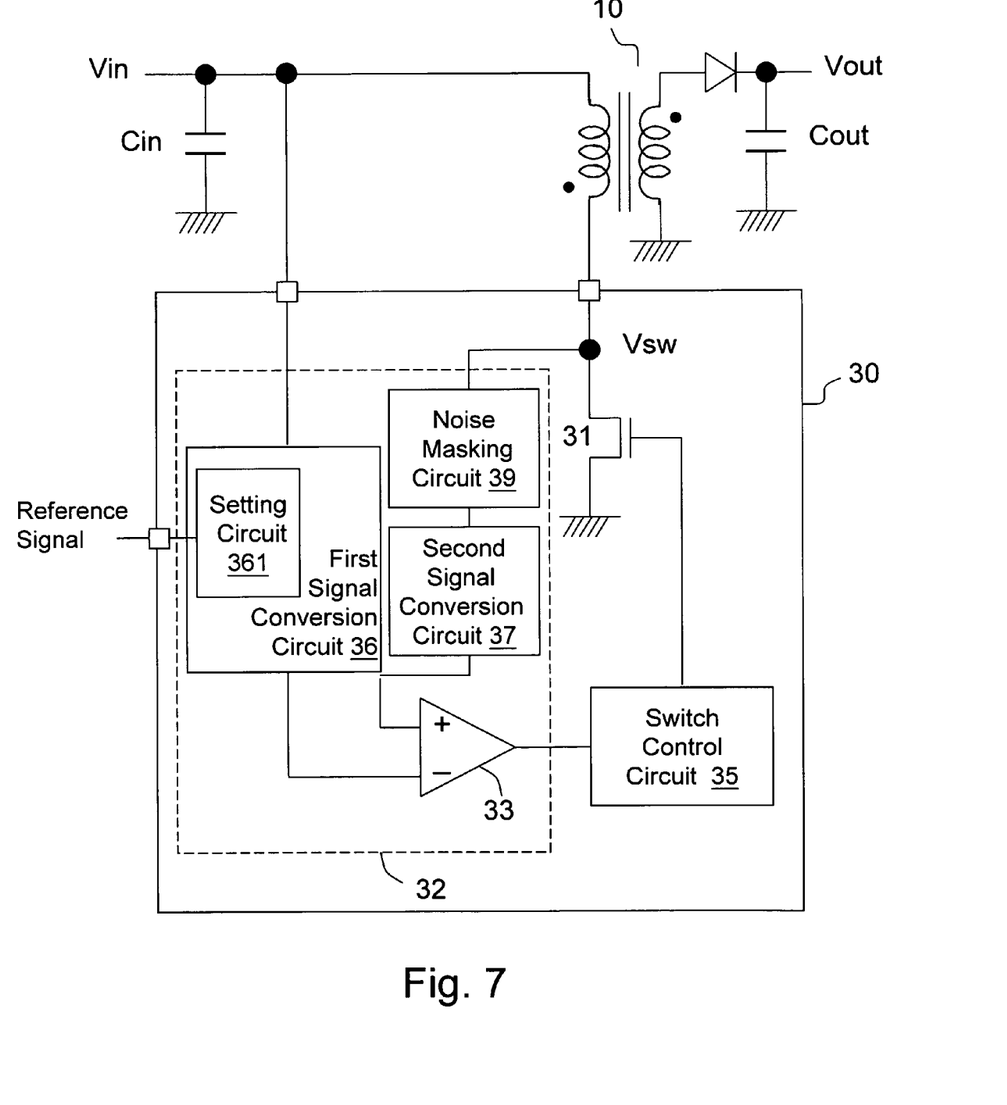
FIGS. 7 to 10 show several other embodiments of the present invention.
Figure 8:
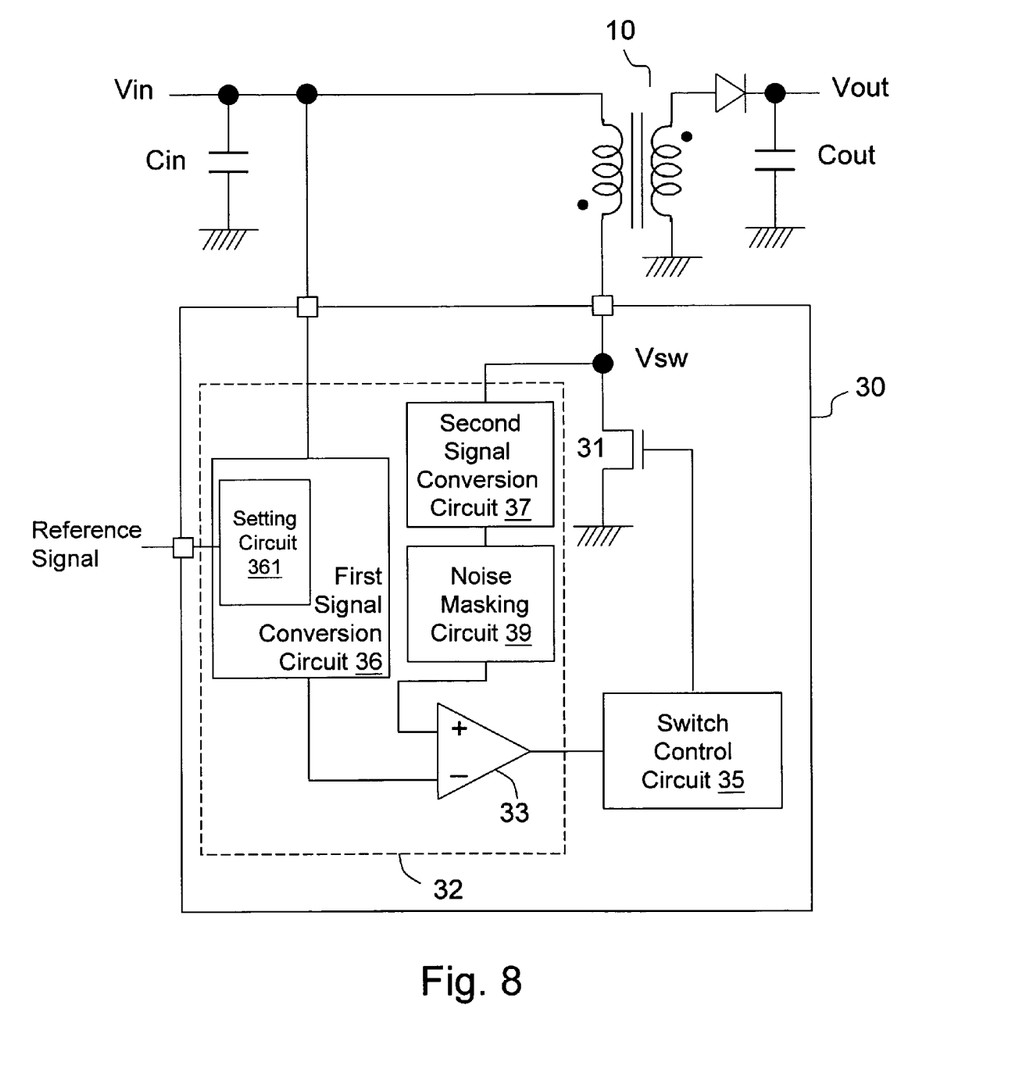
Figure 9:
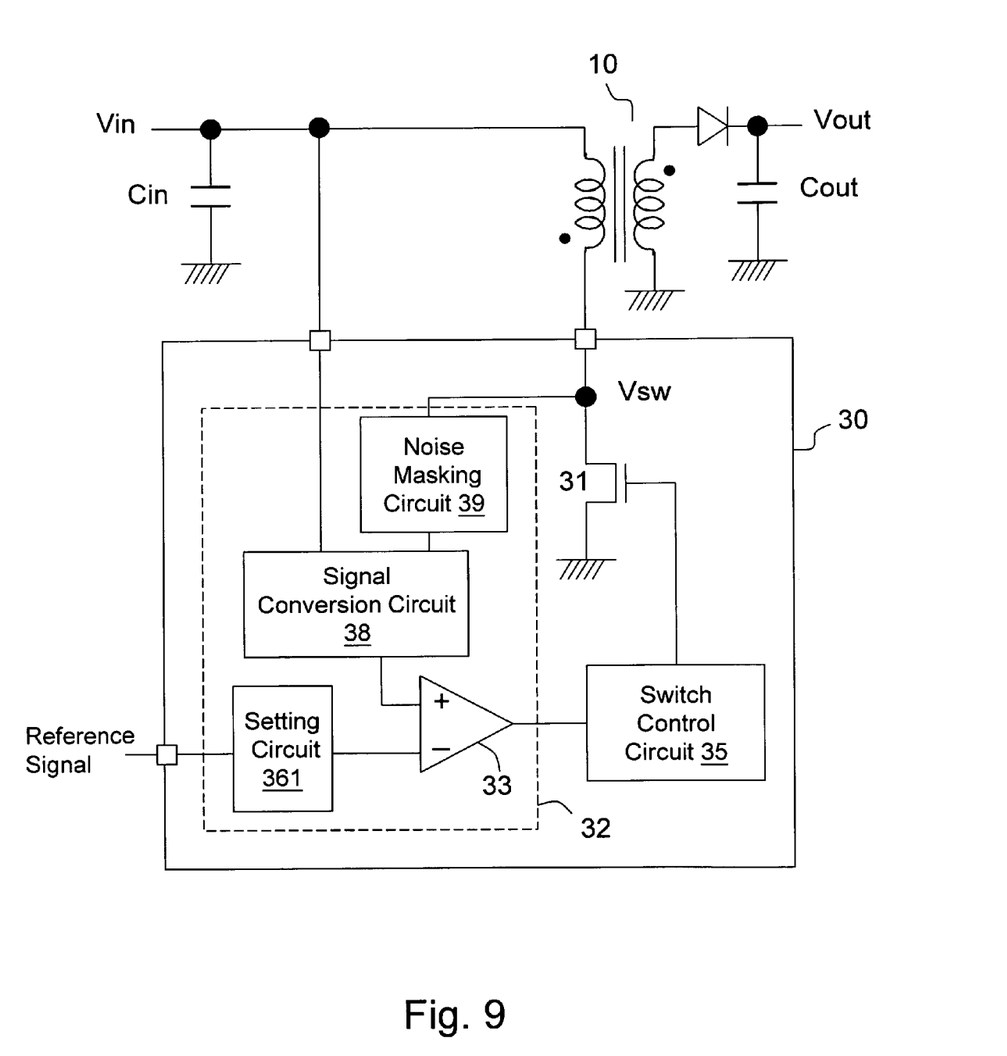
Figure 10:
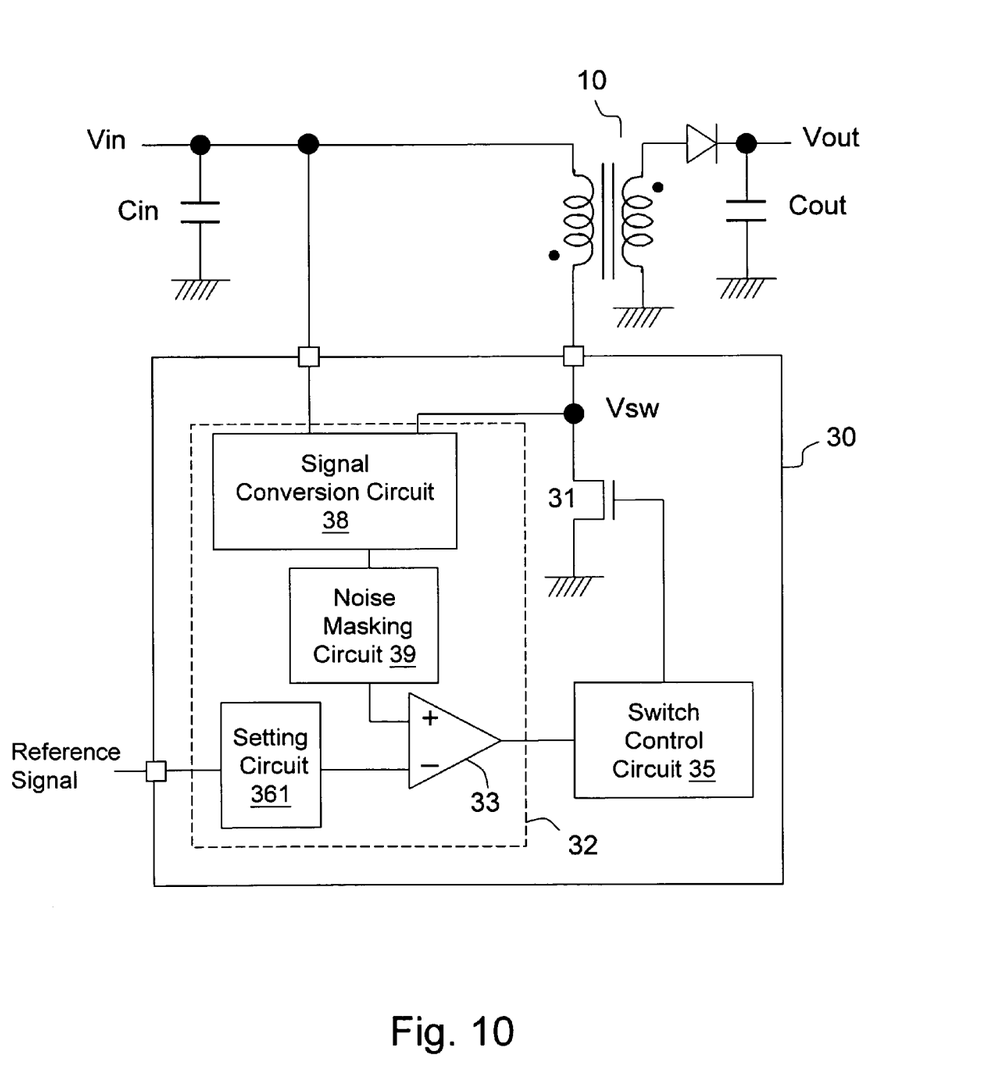

The setting circuit 361 may be embodied in many ways. FIG. 6 shows one example. An operational amplifier 363 and a transistor 364 constitute a circuit follower 365 which generates a current Iset. The current Iset is equal to Vset/Rset. When Vset is fixed, Iset can be determined by adjusting Rset. A current mirror 366 duplicates Iset to output a setting signal.

Figure 11:
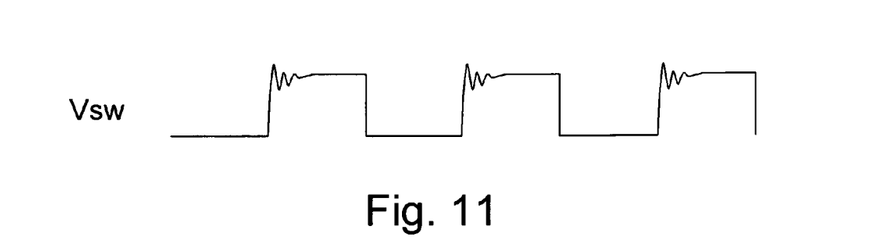
FIG. 11 shows switching ringing in the voltage signal Vsw.
Figure 12:
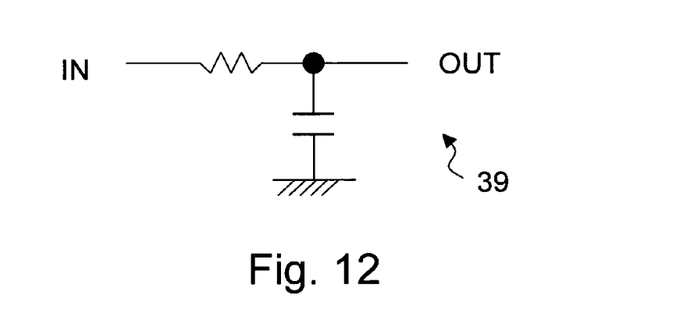
FIG. 12 shows an example of a noise masking circuit formed by a low-pass filter.
Figure 13:
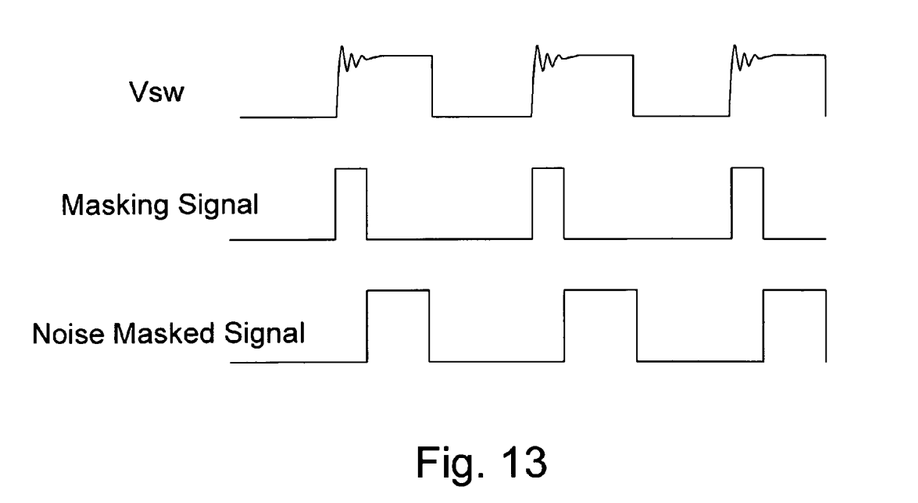
FIG. 13 shows an example to mask a noise by a masking signal.

Referring to FIG. 11, when the power switch 31 is switching, a switching ringing occurs in the voltage Vsw, which should preferably be masked or filtered. To this end, according to the present invention, a noise masking circuit 39 is provided. The noise masking circuit 39 can be arranged in various ways as shown in FIGS. 7-10: to filter the noise in the voltage Vsw and then convert the filtered signal (as the embodiments shown in FIG. 7 and FIG. 9), or to convert the voltage Vsw and then filter the noise in the converted signal (as the embodiments shown in FIG. 8 and FIG. 10). The noise masking circuit 39, for example, can be embodied by a low-pass filter as shown in FIG. 12, or by masking a short beginning period of the voltage signal Vsw in each time the power switch 31 switches. Referring to FIG. 13 for the latter case, taking the arrangement shown in FIG. 7 and FIG. 9 as an example, the noise masking circuit 39 generates a masking signal each time when the power switch 31 switches high. Masked by the masking signal, the voltage signal Vsw becomes the third waveform as shown in FIG. 13, which is output as the output signal of the noise masking circuit 39. Thus, the comparator 33 will not misjudge and generate an incorrect output because of the switching ringing. A similar arrangement can be applied to the noise masking circuits 39 shown in FIG. 8 and FIG. 10 such that the noise does not affect the circuit operation.

From the above description of the embodiments, one can readily recognize the advantages of this invention over prior art. First, the output voltage can be set flexibly in correspondence to the transformer winding ratio. Second, the setting can be easily achieved by one resistor Rset.

The present invention has been described in considerable detail with reference to certain preferred embodiments thereof. It should be understood that the description is for illustrative purpose, not for limiting the scope of the present invention. Those skilled in this art can readily conceive variations and modifications within the spirit of the present invention. For example, the application of the invention is not limited to photoflash chargers, but can be applied to any power supply which converts a voltage by a transformer. And, a circuit or device represented by a single block in the figures can be integrated with another circuit, or dismantled to separate circuits (for example, the switch control circuit 35 and the comparator 33 can be integrated into one single circuit; the setting circuit 361 can be moved out from the sensing circuit 32, etc.). In view of the foregoing, the spirit of the present invention should cover all such and other modifications and variations, which should be interpreted to fall within the scope of the following claims and their equivalents.

What is claimed is:

1. A power supply control circuit, the power supply providing an output voltage to an output terminal from an input terminal through a transformer having a primary winding and a secondary winding, the power supply control circuit comprising: a power switch electrically connected with the primary winding; a switch control circuit controlling the power switch; and a sensing circuit converting voltage signals (Vin and Vsw) obtained from the two sides of the primary winding to a first and a second current signals (Ia and Ib), and supplies an output signal to the switch control circuit according to the first, the second, and a setting current signal (Iset), wherein the sensing circuit includes a setting circuit for providing the setting current signal to decide the output voltage such that the output voltage is settable by the setting current signal in correspondence to a turn ratio (N) of the secondary winding to the primary winding, wherein Ia=gm*Vin and Ib=gm*Vsw, in which Vin and Vsw are the voltage signals obtained from the two sides of the primary winding; Ia and Ib are the first and second current signals converted from the voltage signals Vin and Vsw, respectively; and gm is a conversion ratio by which the sensing circuit converts the voltage signals Vin and Vsw to the first and second current signals Ia and Ib, respectively; and wherein the output voltage and the setting current signal has the following relationship: Vout=(1/gm)*N*Iset, wherein Vout is the output voltage; N is the turn ratio of the secondary winding to the primary winding is N; and Iset is the setting current signal.

2. The power supply control circuit of claim 1, wherein the sensing circuit comprises a current comparator which generates the output signal by comparing the setting current signal and a difference between the first and the second current signals.

3. The power supply control circuit of claim 1, wherein the sensing circuit comprises a current comparator, which generates the output signal by comparing the second current signal and a sum of the first current signal and the setting current signal.

4. The power supply control circuit of claim 1, wherein the setting circuit comprises:
   a current follower circuit generating the setting current signal according to a reference signal; and
   a current mirror duplicating the setting current signal and outputting the duplicated setting current signal.

5. The power supply control circuit of claim 1, wherein the reference signal is determined by a resistor.

6. The power supply control circuit of claim 1, wherein the sensing circuit further comprises a noise masking circuit for masking a noise generated when the power switch is switching.

7. A method for sensing voltage in the power supply control circuit, comprising the steps of: providing a power supply, the power supply providing an output voltage to an output terminal (Vout) from an input terminal through a transformer having a primary winding and a secondary winding; providing a power switch electrically connecting to the primary winding; generating a first and a second current signals (Ia and Ib) according to voltage signals (Vin and Vsw) obtained from two sides of the primary winding; generating a setting current signal (Iset); controlling the power switch according to the first, the second, and the setting current signals; and deciding the output voltage according to the setting current signal such that the output voltage is settable by the setting current signal in correspondence to a turn ratio (N) of the secondary winding to the primary winding, wherein Ia=gm*Vin and Ib=gm*Vsw, in which Vin and Vsw are the voltage signals obtained from the two sides of the primary winding; Ia and Ib are the first and second current signals converted from the voltage signals Vin and Vsw, respectively; and gm is a conversion ratio by which the sensing circuit converts the voltage signals Vin and Vsw to the first and second current signals Ia and Ib, respectively; and wherein the output voltage and the setting current signal has the following relationship: Vout=(1/gm)*N*Iset, wherein Vout is the output voltage; N is the turn ratio of the secondary winding to the primary winding is N; and Iset is the setting current signal.

8. The method of claim 7, wherein the step of generating the first and the second current signals according to the voltage signals obtained from two sides of the primary winding comprises: converting the voltage signals to current signals.

9. The method of claim 8, wherein the step of controlling the power switch comprises:
   comparing the second current signal and a sum of the first current signal and the setting current signal; and
   controlling the power switch according to the comparison.

10. The method of claim 8, wherein the step of controlling the power switch comprises:
    comparing the setting current signal and a difference between the first current signal and the second current signal; and
    controlling the power switch according to the comparison.

11. The method of claim 7, wherein the setting current signal is determined by a resistor.

12. The method of claim 11, wherein the step of generating the setting current signal comprises:
    receiving a reference voltage, and
    generating the setting current signal according to the resistance of the resistor and the reference voltage.

13. The method of claim 9, further comprising the step of: masking a noise generated when the power switch is switching.

* * * * *